(12) United States Patent
Kim et al.

(10) Patent No.: US 9,710,024 B2
(45) Date of Patent: Jul. 18, 2017

(54) ELECTRONIC DEVICE

(71) Applicant: Samsung Electronics Co., Ltd., Suwon-si, Gyeonggi-do (KR)

(72) Inventors: Dong-sung Kim, Suwon-si (KR); Hae-Soo Kim, Yongin-si (KR); Cha-Hoon Park, Seoul (KR); Kang-Seok Cho, Suwon-si (KR); Sung-Geun Joo, Suwon-si (KR); Sung-Hun Kim, Suwon-si (KR); Kwang-Yong Lee, Hwaseong-si (KR); Sung-Yun Jin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/044,615

(22) Filed: Feb. 16, 2016

(65) Prior Publication Data

US 2016/0302320 A1 Oct. 13, 2016

(30) Foreign Application Priority Data

Apr. 10, 2015 (KR) .................. 10-2015-0050641

(51) Int. Cl.
*G06F 1/16* (2006.01)
*G06F 1/18* (2006.01)

(52) U.S. Cl.
CPC ............ *G06F 1/1698* (2013.01); *G06F 1/183* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,597,659 A | * | 8/1971 | Hoffman | H05K 7/023 361/726 |
| 5,257,163 A | * | 10/1993 | Buist | G06F 1/18 361/679.22 |
| 5,435,737 A | * | 7/1995 | Haga | G06F 1/183 361/679.37 |
| 5,515,239 A | * | 5/1996 | Kamerman | H05K 7/1441 206/509 |
| 5,604,662 A | * | 2/1997 | Anderson | G06F 1/184 312/204 |
| 5,909,357 A | * | 6/1999 | Orr | G06F 1/16 361/679.46 |

(Continued)

*Primary Examiner* — Lisa Lea Edmonds
(74) *Attorney, Agent, or Firm* — Jefferson IP Law, LLP

(57) ABSTRACT

An electronic device is provided. The electronic device includes a main unit including a first top surface, a first bottom surface opposite to the first top surface, and a first side surface configured to connect the first top surface and the first bottom surface, and at least one module unit including a second top surface, a second bottom surface opposite to the second top surface, and a second side surface configured to connect the second top surface and the second bottom surface. The module unit may be configured to couple to and uncouple from the main unit or another module unit in a state where one of the second top surface, the second bottom surface, and the second side surface faces one of the first top surface, the first bottom surface, and the first side surface. When the module unit is coupled to the main unit, the module unit may be electrically connected with the main unit.

16 Claims, 13 Drawing Sheets

(56) References Cited

U.S. PATENT DOCUMENTS

| | | | | |
|---|---|---|---|---|
| 6,462,953 B2* | 10/2002 | Tong | ............... | H01R 25/00 361/728 |
| 6,469,901 B1* | 10/2002 | Costner | ............... | G06F 1/18 361/730 |
| 6,607,408 B2* | 8/2003 | Milan | ............... | G06F 13/4095 361/732 |
| 6,640,235 B1* | 10/2003 | Anderson | ............... | G06F 1/184 361/679.33 |
| 6,661,648 B2* | 12/2003 | Dayley | ............... | G06F 1/181 361/679.22 |
| 6,716,047 B2* | 4/2004 | Milan | ............... | G06F 13/4095 361/731 |
| 6,795,318 B2* | 9/2004 | Haas | ............... | H04M 1/0254 361/728 |
| 7,099,151 B2* | 8/2006 | Jones | ............... | H05K 5/0021 361/679.02 |
| 7,099,152 B2* | 8/2006 | Gasbarro | ............... | G06F 1/1632 312/223.3 |
| 7,239,509 B1* | 7/2007 | Roeske | ............... | G06F 1/1632 361/679.02 |
| 7,242,589 B1* | 7/2007 | Cheng | ............... | H05K 5/0021 361/735 |
| 7,307,834 B2* | 12/2007 | Jones | ............... | H05K 5/0021 361/679.55 |
| 7,529,096 B2* | 5/2009 | Lin | ............... | G06F 1/18 312/223.2 |
| 9,030,829 B2* | 5/2015 | Ma | ............... | A45B 3/00 135/16 |
| 2002/0067593 A1* | 6/2002 | Milan | ............... | G06F 13/4095 361/679.45 |
| 2002/0097563 A1* | 7/2002 | Costner | ............... | G06F 1/18 361/735 |

\* cited by examiner

ELECTRONIC DEVICE

CROSS-REFERENCE TO RELATED APPLICATION(S)

This application claims the benefit under 35 U.S.C. §119(a) of a Korean patent application filed on Apr. 10, 2015 in the Korean Intellectual Property Office and assigned Serial number 10-2015-0050641, the entire disclosure of which is hereby incorporated by reference.

TECHNICAL FIELD

The present disclosure relates to an electronic device. More particularly, the present disclosure relates to a personal computer.

BACKGROUND

As the information and communication industry has been developed, an electronic device may provide a means that allows a user to produce, accumulate or receive various information items. As high speed and large scale wireless communication has been popularized, mobile communication has been rapidly developed. However, a personal computer (PC) is still usefully utilized for producing, accumulating or receiving information in an ON/OFF line. In a private home or a business environment, a desktop PC has been mainly utilized, and a user may directly replace various components relatively easily so that the function of the desktop PC can be extended or the performance of the desktop PC can be improved.

Some users use, for example, a notebook PC, a tablet PC, or an all-in-one PC instead of the desktop PC. The notebook PC or the tablet PC has advantages in that they are portable and occupy a small space, and the all-in-one PC does not require a separate additional device, for example, a separate monitor to be connected thereto so that the environment of the space where the PC is installed can be kept neatly. However, the notebook PC, the tablet PC, or the all-in-one PC may incur more expense than the desktop PC in order to implement the same function. In addition, unlike the desktop PC, it is difficult for the user to replace components for the notebook PC, the tablet PC, or the all-in-one PC so that there is a limit in extending the function thereof or improving the performance thereof even if there is a user's request.

Recently, as the integration degrees of electronic devices have been increased, the desktop PC has been gradually miniaturized by gathering the advantages of the desktop PC and, for example, the notebook PC. However, even in a miniaturized desktop PC, it may be difficult for the user to directly replace components desired by the user. For example, in the miniaturized desktop PC, various components (e.g., a processor, a graphic module unit, or a sound module unit) may be provided in one integrated card form so that there may be a difficulty in extending the function thereof or improving the performance thereof according to the user's request.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device, such as a personal computer (PC), which is easy to extend a function or improve a performance while being miniaturized.

Another aspect of the present disclosure is to provide an electronic device by configuring the main unit of the electronic device and module units having different functions to be attachable to/removable from each other so that a function can be extended or a performance can be improved as needed.

Another aspect of the present disclosure is to provide an electronic device capable of securing the portability of a notebook PC and an extensibility of a desktop PC.

In accordance with an aspect of the present disclosure, an electronic device is provided. The electronic device includes a main unit including a first top surface, a first bottom surface opposite to the first top surface, and a first side surface configured to connect the first top surface and the first bottom surface, and at least one module unit including a second top surface, a second bottom surface opposite to the second top surface, and a second side surface configured to connect the second top surface and the second bottom surface. The module unit may be configured to couple to and uncouple from the main unit or another module unit in a state where one of the second top surface, the second bottom surface, and the second side surface faces one of the first top surface, the first bottom surface, and the first side surface. When module unit is coupled to the main unit, the module unit may be electrically connected with the main unit. Each of the main unit and the module unit(s) may have a cylindrical shape, and the main unit and the module unit(s) may be coupled to each other to form a larger (or longer) cylindrical shape. Different functions (e.g., a power function, a graphic processing function, an optical function of, for example, a camera or a projector, and a storage medium function) are incorporated in the module units so that the module units may be coupled with the main unit to extend the function of the electronic device or improve the performance of the electronic device.

According to various embodiments of the present disclosure, the main unit of the electronic device itself is capable of functioning as one PC, and according to a function desired by a user, one or more of the module units may be selected and connected to the main unit (or another module unit). For example, among the module units, in which different functions are incorporated, a module unit desired by the user may be selected and mounted on the main unit. Accordingly, the user may extend the function of the electronic device or improve the performance of the electronic device desired by the user while reducing an economic burden. In addition, since a structure of coupling/separating the main unit and the module units may be implemented in a rotating type (or another binding type such as a snap-fit structure), the user may easily attach/detach the module unit(s) to/from the main unit. Furthermore, by coupling a module unit, in which a rechargeable battery is embedded, to the main unit, the user may use the electronic device according to various embodiments of the present disclosure while carrying the electronic unit. Moreover, the main unit and the module units may be utilized as design tools by manufacturing the main unit and the module units in a beautiful shape while miniaturizing them.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
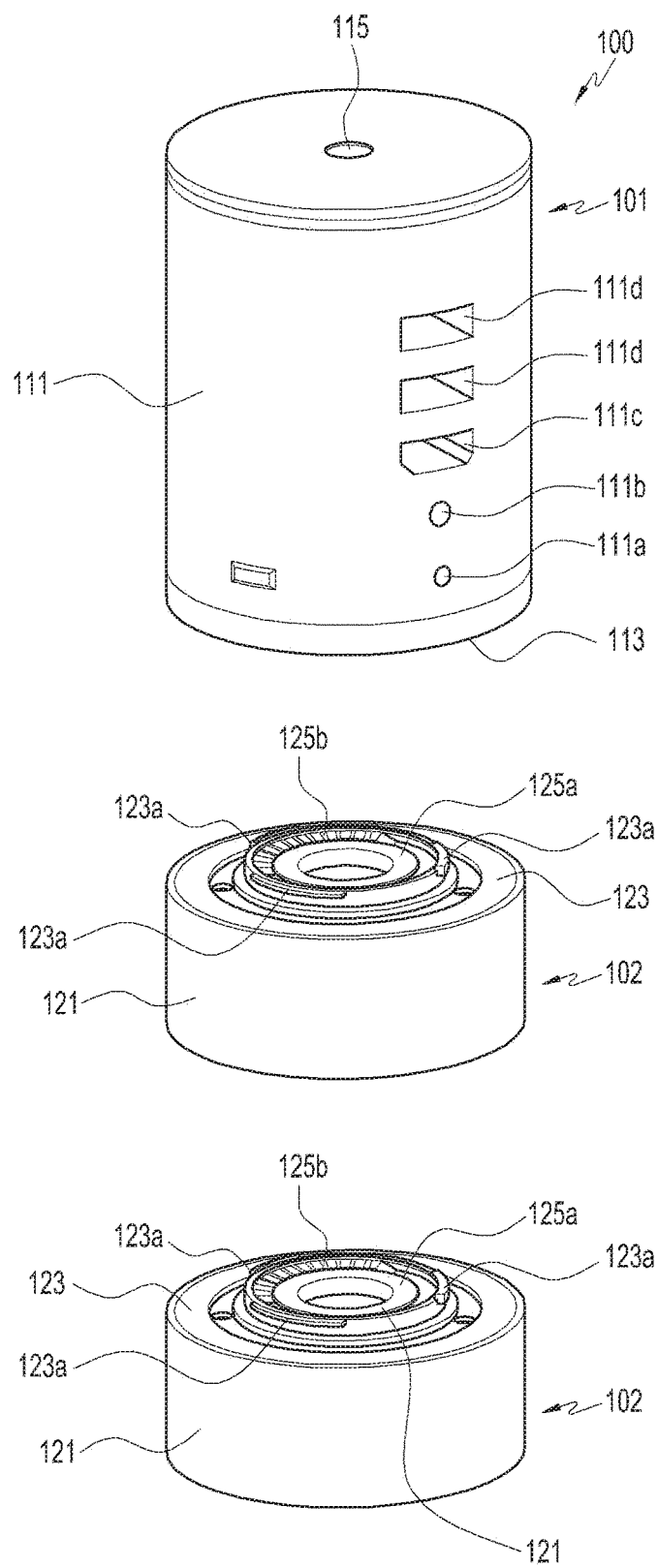
FIG. 1 is a perspective view illustrating an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e g, third element) may be interposer between them. In contrast, it may be understood that when an element (e.g., first element) is referred to as being "directly connected," or "directly coupled" to another element (second element), there are no element (e g, third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

In the present disclosure, the terms are used to describe specific embodiments, and are not intended to limit the present disclosure. In the description, it should be understood that the terms "include" or "have" indicate existence of a feature, a number, an operation, a structural element, parts, or a combination thereof, and do not previously exclude the existences or probability of addition of one or more another features, numeral, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification. In some cases, even the term defined in the present disclosure should not be interpreted to exclude embodiments of the present disclosure.

For example, the electronic device may be a smartphone, a portable phone, a game player, a television (TV), a display unit, a heads-up display unit for a vehicle, a notebook computer, a laptop computer, a tablet personal computer (PC), a personal media player (PMP), a personal digital assistant (PDA), and the like. The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a local area network (LAN), a wireless LAN (WLAN), a wide area network (WAN), an Internet, a small area network (SAN) or the like, but is not limited thereto.

FIG. 1 is a perspective view illustrating an electronic device 100 according to various embodiments of the present disclosure.

Referring to FIG. 1, the electronic device 100 may include a main unit 101, and at least one module unit 102 removably provided in the main unit 101. In the present embodiment, a structure, in which one pair of module units 102 are coupled or connected to the main unit 101, is exemplified. However, the main unit 101 itself may provide a function of, for example, a personal computer (e.g., a desktop PC or a notebook PC), and when the module unit(s) 102 is (are) coupled or connected thereto, the function of the electronic device 100 can be extended or the performance of the electronic device 100 can be improved.

The main unit 101 may have a cylindrical shape including a top surface, a bottom surface opposite to the top surface, and a side surface that connects the top surface and the bottom surface of the main unit 101. For example, the top surface and the bottom surface of the main unit 101 may have a circular shape, and the side surface of the main unit 101 may be formed in a curved shape. For example, the main unit 101 may include a bottom-opened cylindrical first housing 111, and a first cover member 113 coupled to the bottom surface of the first housing 111 to close the first housing 111. The first housing 111 may provide the top surface and the side surface of the main unit 101 and the first cover member 113 may provide the bottom surface of the main unit 101.

A switch member 115 may be provided on the top surface of the main unit 101. Through the switch member 115, the user may turn ON/OFF the power of the electronic device 100. On the side surface of the main unit 101, one or more connector members 111a, 111b, 111c, and 111d may be arranged (or exposed). The connector members provided on the side surface of the main unit 101 may include at least one of a power connector 111a, an ear jack 111b, a high definition multimedia interface (HDMI) connector 111c, a universal serial bus (USB) connector 111d, and a storage medium socket 111e (see FIG. 3). In addition, the main unit 101 may further include various connectors (not illustrated) as means for connection to an external device or a network, including a connector for connection to a communication cable (e.g., a LAN cable). The bottom surface of the main unit 101, for example, the first cover member 113 may be provided with structures for binding or coupling the module unit(s) 102, which will be described in detail with reference to, for example, FIG. 4.

The module unit(s) 102 may accommodate a battery and circuit devices configured as one of or a combination of two or more of a graphic module, a communication module, an optical module, a storage module, a sound module, and a sensor module equipped with various sensors, such as a temperature/humidity sensor. In addition, the module unit 102 may be a component equipped with the connector member(s) described above or another type of connector member(s) not described above. Some circuit devices or connector members, which may be embedded in the module unit 102 have been described by way of an example merely for making the detailed description of the present disclosure concise. For example, according to various embodiments of the present disclosure, it shall be noted that the circuit devices or connector members, which may be embedded in the module unit 102 of the electronic device 100, are not limited to those described above.

Among the module units 102, in each of the above-described circuit devices or connector members are embedded, the user may select and purchase a desired module unit 102 and couple the module unit 102 with the main unit 101. In addition, even if the user purchased a plurality of module units 102, the user may couple one or more selected module units 102 to the main unit 101 so as to extend or improve the function of the main unit 101 as needed. For example, assuming that, among the module units 102 purchased by the user, a first module unit includes a battery embedded therein and a second module unit includes a storage module embedded therein, the user may couple the first module unit to the main unit 101 and use the electronic device 100 while carrying the electronic device 100. When there is a module unit, in which an optical module such as a projector and a speaker are embedded, among the module units possessed by the user, the module unit may be coupled to the main unit 101 or to any other module unit coupled to the main unit 101. Accordingly, the user may conveniently use a multi-media function. For example, the user may output various image information items or enjoy various video images only with the electronic device 100 according to the function of the module unit coupled to the main unit 101.

The module unit 102 may have a cylindrical shape including a top surface, a bottom surface opposite to the top surface, and a side surface connecting the top surface and the bottom surface of the module unit 102. For example, the top surface and the bottom surface of the module unit 102 may have a circular shape, and the side surface of the module unit 102 may be formed in a curved surface. The top surface of the module unit 102 may be provided with a structure capable of being coupled to the bottom surface of the main unit 101 or the bottom surface of another module unit. For example, the module unit 102 may be coupled to the bottom surface of the main unit 101 or the bottom surface of another module unit. The module unit 102 may include a structure to bind or couple the module unit 102 to, for example, the main unit 101, which will be described in more detail with reference to FIG. 5.

Although the specific embodiment of the present disclosure exemplifies a structure in which the switch member 115 is disposed on the top surface of the main unit 101 without any other structure disposed on the top surface of the main unit 101, the top surface of the main unit 101 may also be provided with a structure capable of being coupled to the module unit 102. The structure provided on the top surface of the main unit 101 may be implemented to be the same as the structure provided on the top surface of the module unit 102. In addition, although the specific embodiment of the present disclosure exemplifies a structure bound and coupled in a rotating manner when the module unit 102 is bound and coupled to the main unit 101 or another module unit, the present disclosure is not limited thereto. For example, the module unit 102 may be bound and coupled to the main unit 101 through a snap-fit structure, a magnet-type coupling structure, or a separate mechanical coupling device.

Figure 2:
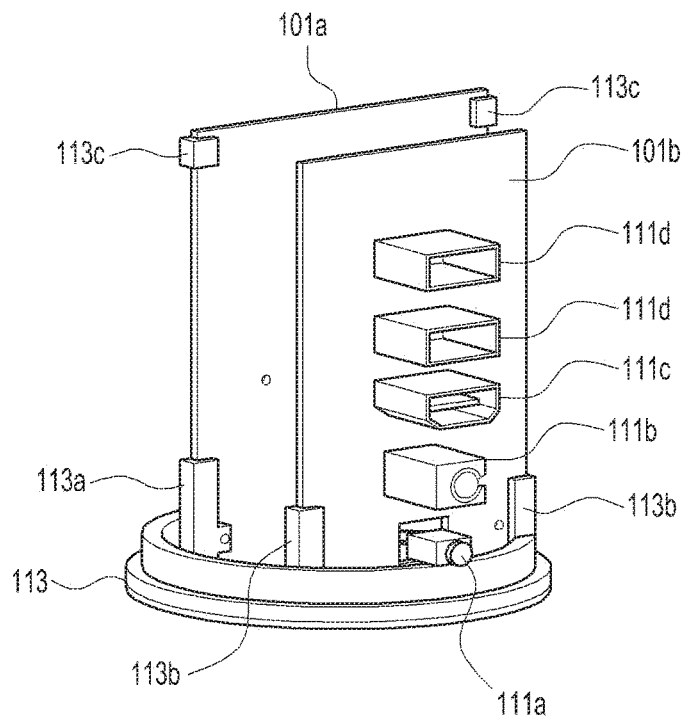
FIG. 2 is a perspective view illustrating a main configuration of a main unit in an electronic device according to various embodiments of the present disclosure.

FIG. 2 is a perspective view illustrating a main configuration of the main unit 101 in the electronic device 100 according to various embodiments of the present disclosure.

Figure 3:
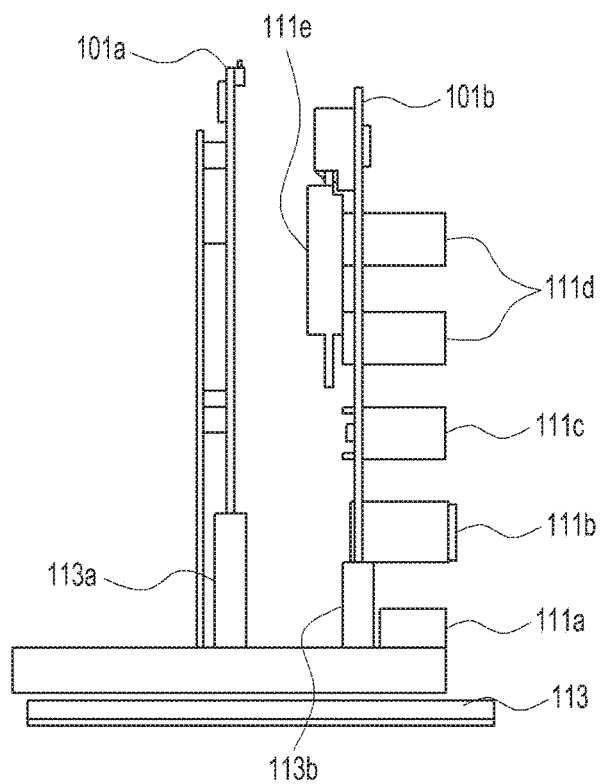
FIG. 3 is a side view illustrating the main configuration of the main unit in the electronic device according to various embodiments of the present disclosure.

FIG. 3 is a side view illustrating the main configuration of the main unit 101 in the electronic device 100 according to various embodiments of the present disclosure.

Referring to FIGS. 2 and 3, the main unit 101 may include one or more circuit boards 101*a* and 101*b* disposed within the first housing 111. For example, a first circuit board 101*a*, on which, for example, a processor and a storage medium are mounted, and a second circuit board 101*b* on which the above-described connector member 111*a*, 111*b*, 111*c*, 111*d*, and 111*e* may be disposed within the first housing 111. The connector members 111*a*, 111*b*, 111*c*, 111*d*, and 111*e* may be arranged along the longitudinal direction (or the height direction) of the main unit 101, and some of the connector members 111*a*, 111*b*, 111*c*, 111*d*, and 111*e* (e.g., the above-described storage medium socket 111*e*) may be disposed on a surface different from the surface, on which the other connector members are disposed.

The main unit 101 may include fixing members 113*a* and 113*b* in order to support and fix the circuit boards 101*a* and 101*b* within the first housing 111. For example, two pairs of the fixing members 113*a* and 113*b* may be provided within the first cover member 113 to fix and support the opposite edges of the lower ends of the first and second circuit boards 101*a* and 101*b*. The opposite edges of the lower ends of the first and second circuit boards 101*a* and 101*b* may be inserted into and fixed to the fixing members 113*a* and 113*b*, respectively, and connected with each other through a connection means, such as a flexible printed circuit board. In addition, the opposite edges of the top end of the first circuit board 101*a* and/or second circuit board 101*b* may also be inserted into and fixed to the second fixing members 113*c*, respectively. The second fixing members 113*c* may be formed on the inner wall of the first housing 111. The shapes and arrangements of the fixing members 113*a*, 113*b*, and 113*c* as described above may be properly designed in consideration of, for example, the internal space of the first housing 111 or the shapes of the first and second circuit boards 101*a* and 101*b*.

Figure 4:
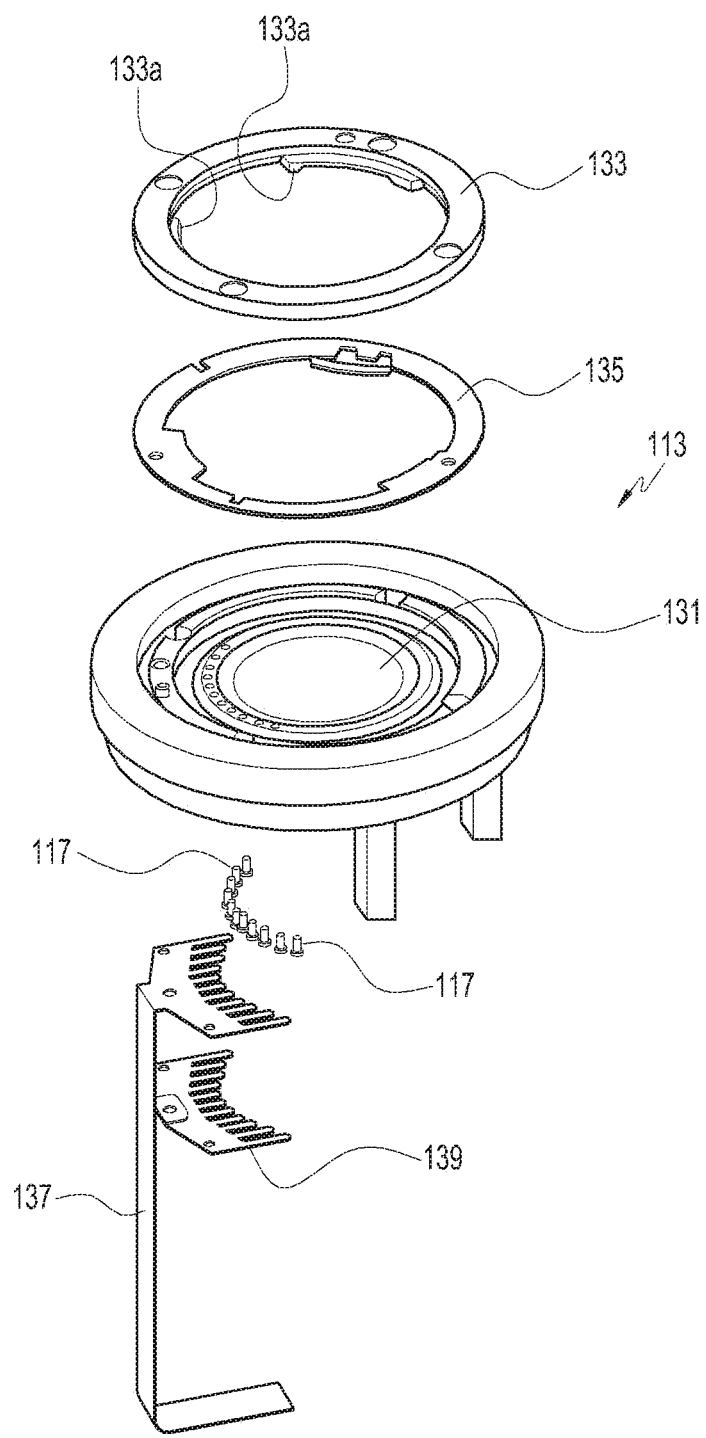
FIG. 4 is an exploded perspective view for describing a coupling structure provided in the main unit of the electronic device according to various embodiments of the present disclosure.

FIG. 4 is an exploded perspective view for describing a coupling structure provided in the main unit 101 of the electronic device 100 according to various embodiments of the present disclosure.

Referring to FIG. 4, the bottom surface of the main unit 101, for example, the first cover member 113 may be provided with not only a structure for mechanical binding and coupling with the module unit(s) 102, but also a connection structure for electrical connection. The present embodiment discloses a configuration in which the electrical connection between the main unit 101 and the module unit 102 is implemented through a physical contact structure, such as a C-clip, a pogo pin or a connection pad. However, the present disclosure is not limited thereto and data may be received/transmitted between the main unit 101 and the module unit 102 through a wireless communication method. This will be described in detail with reference to, for example, FIG. 15.

The main unit 101 may include a first binding member 133 disposed on the outer surface of the first cover member 113 (e.g., the bottom surface of the main unit 101). The first binding member 133 may be mounted in a mounting recess 131 formed on the outer surface of the first cover member 113 with a gasket 135 being interposed therebetween. The first binding member 133 has a circular plate shape having an opening at the center thereof, in which first binding ribs 133*a* may be formed on the inner peripheral surface of the first binding member 133. The first binding ribs 133*a* may be arranged respectively at positions spaced apart from each other along the circumferential direction on the inner peripheral surface of the first binding member 133. Fastening means may be used for fixing the first binding member 133 to the first cover member 113, and the gasket 135 may form an anti-vibration/waterproof structure by sealing a gap between the first cover member 113 and the first binding member 133. The first binding member 133, for example, the first binding ribs 133*a*, may be utilized as a structure for binding and coupling the main unit 101 to the module unit 102.

On the inner surface of the first cover member 113, a flexible printed circuit board 137 and first connection terminals 117 may be arranged along the circumferential direction, for example, along the direction where the module unit 102 is rotated with respect to the main unit. Each of the first connection terminals 117 may include, for example, a C-clip or a pogo pin, and the first connection terminals 117 may be mounted on and fixed to the flexible printed circuit board 137 and partially protrude into the mounting recess 131 while being positioned within the first cover member 113. The flexible printed circuit board 137 may be connected to any one of the first and second circuit board 101*a* and 101*b* within the first housing 111. On the inner surface of the first cover member 113, a support member 139 is provided to bring a part of the flexible printed circuit board 137, for example, the part, on which the first connection terminals 117 are arranged, to be in contact with and to be fixed to the inner surface of the first cover member 113. As the support member 139 is disposed, the first connection terminals 117 may be stably fixed to the positions provided on the first cover member 113 even if the first connection terminals 117 interfere with any other object on the mounting recess 131. The first connection terminals 117 are connected (or come into contact) with the second connection terminals 125 (see, e.g., FIG. 6) provided in the module unit 102, respectively, so as to provide means for electrically connect the module unit 102 to the main unit 101.

Figure 5:
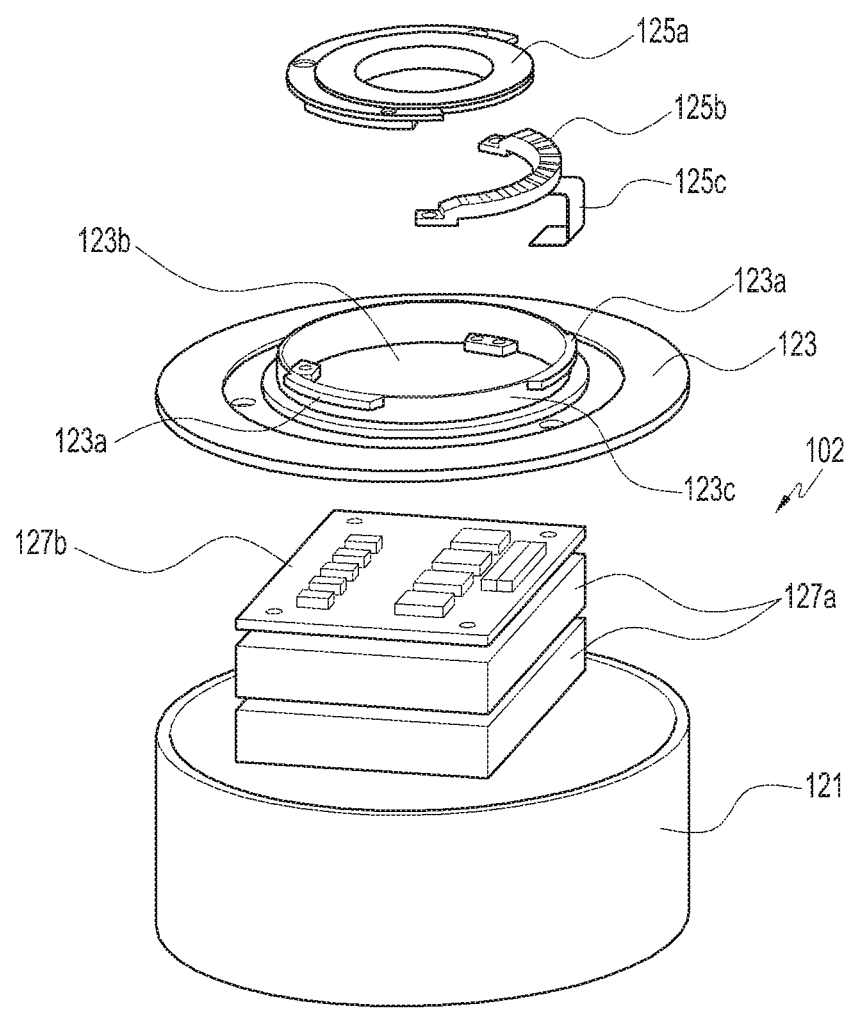
FIG. 5 is an exploded perspective view exemplifying one of the module units of the electronic device according to various embodiments of the present disclosure.

FIG. 5 is an exploded perspective view exemplifying one of the module units 102 of the electronic device 100 according to various embodiments of the present disclosure.

In describing the present embodiment, a module unit, in which a battery is embedded, will be exemplified and described. However, as described above, according to various embodiments of the present disclosure, the electronic device 100 may include a plurality of module units, and the circuit devices embedded in the respective module units may be implemented to be different from each other. Accordingly, the user may purchase and possess a module unit(s), in which a function required by the user is incorporated, and when it is desired to practically use the electronic device 100, proper module unit(s) according to the purpose of using the electronic device 100 may be selected and mounted on the main unit 101.

Referring to FIG. 5, the module unit 102 may include a second housing 121 and a second cover member 123. A battery 127a is embedded in the second housing 121, and a circuit device 127b for stabilizing the power output from the battery 127a may be provided in the second housing 121. The second housing 121 has a top-opened shape, and the second cover member 123 may be coupled to the second housing 121 to cover the second housing 121. On the second cover member 123, a protrusion 123c corresponding to the mounting recess 131 may be formed in the central portion of the second cover member 123, and second binding ribs 123a may be formed on the outer peripheral surface of the protrusion 123c. The second binding ribs 123a may be positioned to be spaced apart from each other along the circumferential direction of the protrusion 123c.

The second binding ribs 123a may be arranged to correspond to the first binding ribs 133a to provide means for binding and coupling the module unit 102 to the main unit 101. For example, when any one surface of the module unit 102 (e.g., the top surface) is coupled to any one surface of the main unit 101 (e.g., the bottom surface) to face each other, the second binding ribs 123a enter the gaps between the first binding ribs 133a, respectively, to be positioned within the mounting recess 131. In the state where the second binding ribs 123a are positioned within the mounting recess 131, when the user rotates the module unit 102 with respect to the main unit 101, the second binding ribs 123a may be moved within the mounting recess 131 to the positions where the second binding ribs 123a face the first binding ribs 133a to bind and fix the module unit 102 to the main unit 101.

An opening 123b may be formed inside the protrusion 123c, in which the second support member 125a and the connection member 125b may be disposed in the opening 123b. The second support member 125a and the connection member 125b may be coupled to form a circular plate shape and mounted in the opening 123b. For example, the second support member 125a and the connection member 125b may be mounted in the coupled state to close the opening 123b. The connection member 125b may include a flexible printed circuit board 125c connected to the circuit device 127b, and the flexible printed circuit board 125c may be connected with the second connection terminals 125 (e.g., connection pads) arranged on the connection member 125b. According to various embodiments of the present disclosure, the second connection terminals 125 may be mounted on and fixed to the flexible printed circuit board 125c and exposed to the top surface of the connection member 125b. The second connection terminals 125 are arranged to correspond to the first connection terminals 117 to electrically connect the module unit 102 to the main unit 101. The arrangement of the second connection terminals 125 and the connection structure through the second connection terminals 125 will be described in more detail with reference to FIG. 6.

FIGS. 6 to 9 are views illustrating electrical connection structures between a main unit 101 and a module unit 102 of the electronic device 100 according to various embodiments of the present disclosure.

Figure 6:
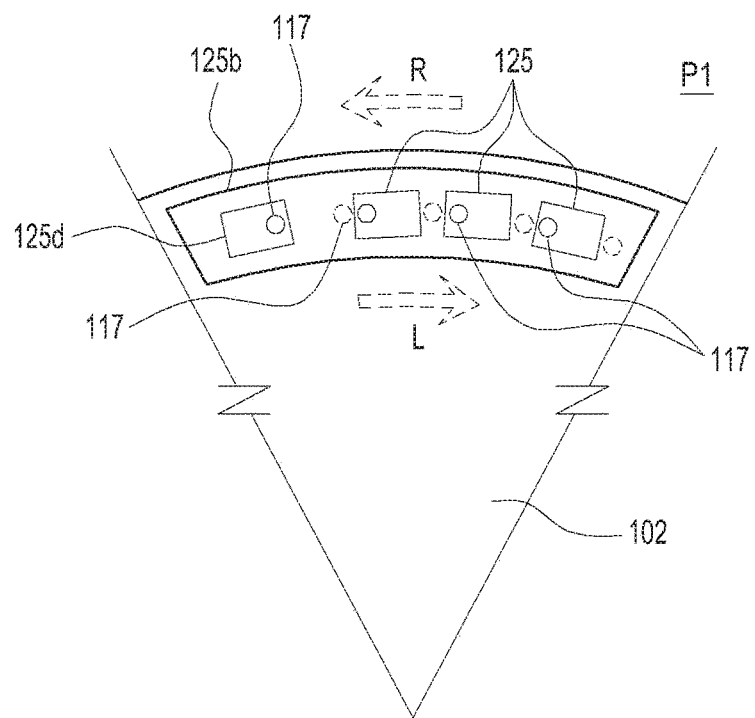
FIGS. 6, 7, 8, and 9 are views illustrating electrical connection structures between a main unit and a module unit of the electronic device according to various embodiments of the present disclosure.
Figure 7:
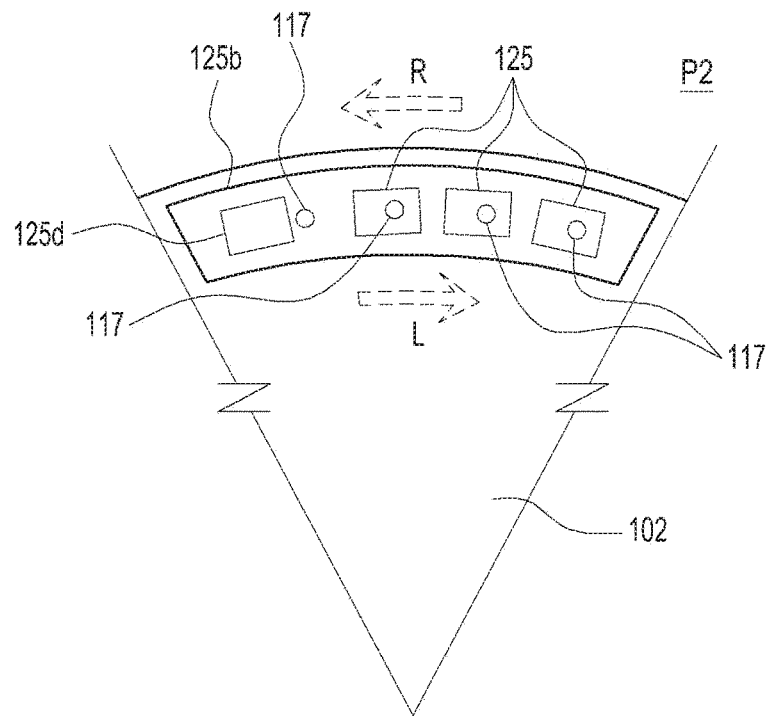

Referring to FIGS. 6 and 7, when the module unit 102 is positioned at a first angular point P1 in the rotating direction L to be bound and coupled to the main unit 101, the second connection terminals 125 and 125d may be connected (come in contact) with the first connection terminals 117, respectively. The second connection terminals 125 and 125d may be arranged at regular intervals along the rotating direction of the module unit 102. However, in a certain embodiment of the present disclosure, an interval where one of the second connection terminals 125 and 125d, for example, the second connection terminal indicated by reference numeral "125d" is arranged may be different from the other intervals in which the other second terminals 125 are arranged. The connection terminal indicated by reference numeral "125d" corresponds to one of the above-described second connection terminals. However, hereinafter, the terminal will be referred to as a "detection terminal" as needed for making the description concise and short. Further, it is noted that the detection terminal may be denoted by the reference numeral and referred to as a second connection terminal.

In the rotating direction L or in the reverse direction R, the second connection terminals 125 may be connected to the first terminals 117, respectively, between a second angular point P2 and the first angular point P1. When the module unit 102 is rotated between the first and second angular points P1 and P2, the second connection terminals 125 may be in sliding contact with the first connection terminals 117. Whereas, when the module unit 102 is rotated to be deviated from the first angular point P1, the detection terminal 125d may be deviated from the corresponding first connection terminal 117. For example, when the module unit 102 is rotated and deviated from the first angular point P1, the detection terminal 125d may be deviated from one of the first connection terminals 117 so that the connection may be released. Even if the connection of the detection terminal 125d is released, when the module unit 102 is positioned between the first and second angular points P1 and P2, the second connection terminals 125 may maintain the state where they are connected with the first connection terminals 117. When the module unit 102 is rotated to be deviated from the angular range between the first and second angular points P1 and P2, all the detection terminal 125d and the second connection terminals 125 may be deviated from the first connection terminals 117. When the electronic device 100 further include, for example, a separate stopper structure, the electronic device 100 may restrict the additional rotation of the module unit 102 in the rotating direction 1 from the first angular point P1.

When the second binding ribs 123a enter the mounting recess 131, the detection terminal 125d and the second connection terminals 125 may enter to a position deviated from the first connection terminals 117 (e.g., a position out of the angular range between the above-described first and second points P1 and P2). When the module unit 102 is rotated in the rotating direction L in the state where the second binding ribs 123a entered the mounting recess 131, the second connection terminals 125 may come in contact with corresponding first connection terminals 117, respectively, when they arrive at the second angular point P2. However, even if the second binding ribs 125 arrive at the second angular point P2, the detection terminal 125d may still be positioned at a point spaced apart from the corresponding first connection terminal 117. When the module unit 102 is further rotated from the second angular point P2 in the rotating direction L to arrive at the first angular point P1, the detection terminal 125d may also come in contact with the corresponding first connection terminal 117. As described above, when the module unit 102 is positioned between the first and second angular points P1 and P2, the second connection terminals 125 may maintain the state where they are in contact with the corresponding first connection terminals 117, respectively.

Through the arrangements of the first and second connection terminals 117, 125, and 125d as described above, power can reliably be supplied from the module unit 102 to the main unit 101. For example, a signal that enables the main unit 101 to recognize whether the module unit 102, in which the battery 127a is embedded, is completely mounted, may be assigned to the detection terminal 125d, and a power line that supplies the power to the main unit 101 may be assigned to each of the second connection terminals 125. Accordingly, even if all the power lines (e.g., the second connection terminals 125 are in the state where they are connected to the first connection terminals 117, respectively (e.g., positioned at the second angular point P2), the electronic device 100 may cut off the power supplied from the module unit 102 to the main unit 101 until the detection terminal 125d is connected to the first connection terminal 117. For example, after a signal indicating a state where the module unit 102 is completely coupled with the main unit 101 (e.g., positioned at the first angular point P1) is generated through the detection terminal 125d, the electronic device 100 may allow the power to be supplied from the module unit 102 to the main unit 101.

The embodiment of the present disclosure described above exemplifies a configuration in which four first connection terminals and second connection terminals 125 and 125d corresponding to the number of the first connection terminals 117 are arranged. However, depending on the amount of the signals exchanged between the main unit 101 and the module unit 102 (e.g., power or data), the number of the first and second connection terminals 117, 125, and 125d may increase or decrease. For example, the configurations illustrated in FIGS. 6 and 7 are schematically illustrated so as to make the drawings and description concise, and the present disclosure is not limited thereto.

When a line for a supply of power is assigned to each of the second connection terminals 125, and the number of the second connection terminals 125 increases, some of the second connection terminals 125 may be connected to one of the first connection terminals 117 even at a position other than the first angular point P1. For example, depending on the rotating angle of the module unit 102, some second terminals 125 may be connected to one of the first connection terminals 117 to be supplied with the power. However, when the power is supplied to the main unit 101 in the state where the second connection terminals 125 are arranged to the first connection terminals other than the first connection terminals designed to correspond to the second connection terminals, respectively, the power may become different from the designed power supplied to the main unit 101. For example, a malfunction or damage of the main unit 101 may be caused. According to various embodiments of the present disclosure, when the detection terminal 125d is arranged as described above, the electronic device 100 may cut off the power supplied from the module unit 102 to the main unit 101 at a position other than the first angular position P1 so that power can be reliably supplied to the main unit 101.

Figure 8:
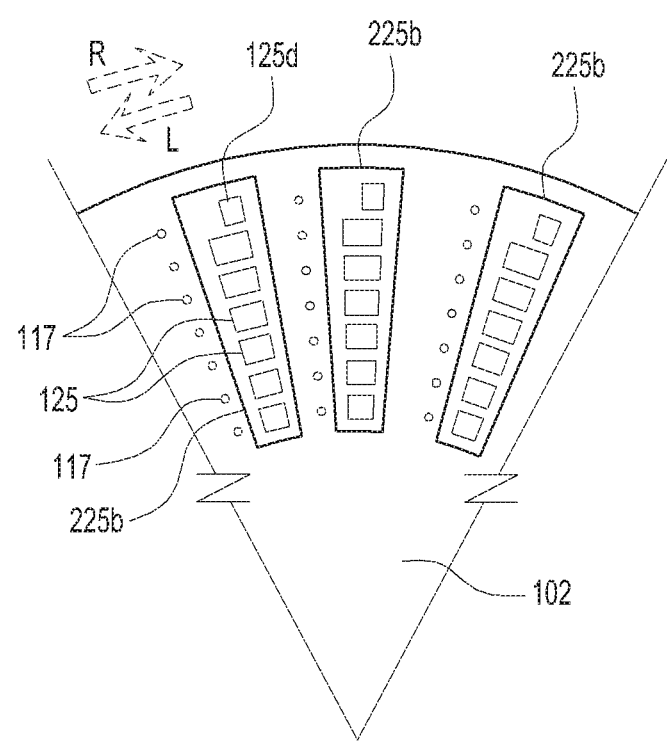

Referring to FIG. 8, according to various embodiments of the present disclosure, in the electronic device 100, the first and second connection terminals 117, 125, and 125d may be arranged along a direction from the center of each of the bottom surface of the main unit 101 and the top surface of the module unit 102 to the side surface, for example, in the radial direction. In addition, each of the second connection terminals 125 and 125d may extend by a predetermined angular range along the rotating direction of the module unit 102, but one of the second connection terminals 125 and 125d may extend by an angular range smaller than that of the other second connection terminals. Hereinafter, the second connection terminal extended by the smallest angular range among the second connection terminals 125 and 125d in the rotating direction of the module unit 102 will be referred to as a "detection terminal 125d."

The module unit 102 may include a connection member 225b extending in the radial direction, and the second connection terminals 125 and the detection terminal 125d may be arranged on the connection member 225b in the radial direction on the top surface (or bottom surface) of the module unit 102. In addition, a plurality of connection members 225b may be arranged along the circumferential direction of the module unit 102 to be spaced apart from each other.

The detection terminal 125d may be positioned adjacent to a side surface of the module unit 102. However, in the configuration of the present disclosure, it is not necessary to limit the position of the detection terminal 125d to this. For example, as illustrated in FIG. 8, at the position where the second connection terminals 125 are deviated from the first connection terminals 117, the detection terminal 125d may be disposed at a farthest angular distance from the first connection terminals 117. More specifically, for example, when the module unit 102 is rotated by the angle of 10 degrees from the position illustrated in FIG. 8 so that the second connection terminals 125 come in contact with the first connection terminals 117, respectively, the detection terminal 125d may come in contact with one of the first connection terminals 117 after the module unit 102 rotates by an angle larger than 10 degrees (e.g., 13 degrees).

In arranging the detection terminal 125d and the second connection terminals 125, after the second connection terminals 125 are connected to the first connection terminals 117, respectively, the detection terminal 125d may be connected to the remaining one among the first connection terminals 117. For example, the electronic device 100 may detect, through the detection terminal 125d, the state where the module unit 102 is completely connected to the main unit 101, and after the state where the detection terminal 125d is connected to one of the first connection terminals 117 is detected, the electronic device 100 may perform a control such that a power or a data signal is applied from the module unit 102 to the main unit 101 (or, from the main unit 101 to the module unit 102).

As described above with reference to FIGS. 6 to 8, according to various embodiments of the present disclosure, the electronic device 100 may electrically connect the main unit 101 and the module unit(s) 102 with each other through the first connection terminals 117 and the second connection terminals 125 and 125d including a detection terminal. According to various embodiments of the present disclosure, when the module unit 102 is coupled to the main unit 101, the detection terminal 125d may be connected to one of the first connection terminals 117 later than the second connection terminals 125, and when the module unit 102 is removed from the main unit 101, the detection terminal 125d may be disconnected from the first connection terminal 117 earlier than the second connection terminals 125. Through this, the electronic device 100 may detect whether the module unit 102 is connected/disconnected and then may allow or cut off the exchange of a power or a data signal between the main unit 101 and the module unit 102 at a proper time point.

Figure 9:
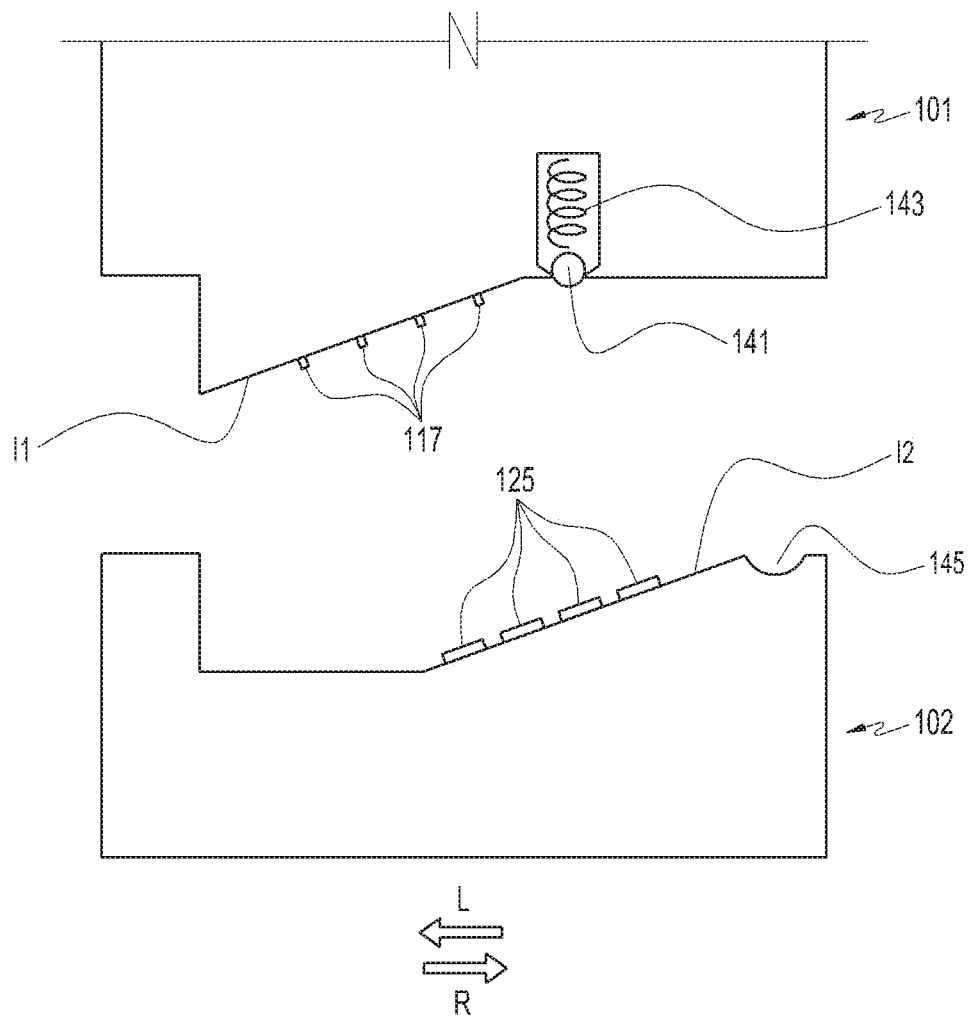

Referring to FIG. 9, the first and second connection terminals 117 and 125 may be arranged on areas formed to be inclined in relation to the rotating direction L of the module unit 102, for example, on the inclined surfaces I1 and I2, respectively. When the module unit 102 is rotated in the direction of binding the module unit 102 to the main unit 101, the inclined surfaces I1 and I2 may be moved toward each other, and when the module unit 102 is rotated in the direction of separating the module unit 102 from the main unit 101, the inclined surfaces I1 and I2 may be moved away from each other. For example, in the state where the module unit 102 is completely coupled to the main unit 101, the second connection terminals 125 may be connected to the first connection terminals 117, respectively. When the module unit 102 is moved in the direction of separating the module unit 102 from the main unit 101, the second connection terminals 125 may be separated in the direction away from the first connection terminals 117 without being in slidable contact with the first connection terminals 117, unlike the prior embodiments of the present disclosure.

In the state where the main unit 101 and the module unit 102 are completely coupled to each other, since the surfaces inclined in relation to the rotating direction L of the module unit 102 (e.g., the inclined surfaces I1 and I2) are in contact with each other to face each other, a force that rotates the module unit 102 in the direction of separating the module unit 102 from the main unit 101 may act on the module unit 102. This may limit the reliability of the connection between the main unit 101 and the module unit 102. According to the present embodiment, the electronic device may further include a stopper device to maintain the connection between the main unit 101 and the module unit 102.

The stopper device may include a stopper member 141 and an elastic member 143, which are accommodated in the main unit 101, and a stopper groove 145 formed in the module unit 102. The stopper member 141 may be supported by the elastic member 143 so that a part of the stopper member 141 protrudes from one surface of the main unit 101 (e.g., the bottom surface). When the module unit 102 is rotated in the direction of coupling the module unit 102 to the main unit 101 so that the first and second connection terminals 117 and 125 are connected with each other, the stopper member 141 may be engaged in the stopper groove 145. For example, the stopper member 141 elastically biased by the elastic member 143 may be engaged in the stopper groove 145 to fix the module unit 102 at a predetermined angular point on the main unit 101. Accordingly, even if the first and second connection terminals 117 and 125 are disposed on the inclined surfaces I1 and I2, respectively, the first and second connection terminals 117 and 125 are capable of maintaining the connection state.

In the electronic device according to the present embodiment, the first and second connection terminals 117 and 125 are arranged on the inclined surfaces I1 and I2, respectively. Thus, it is possible to prevent the friction (e.g., sliding contact) of the main unit 101 or the module unit 102 against any other portion in the process of rotating the module unit 102. In addition, the electronic device according to the present embodiment is capable of maintaining the connection state even though the first and second connection terminals 117 and 125 are arranged on the inclined surfaces I1 and I2 by fixing the module unit 102 at a predetermined angular point using the stopper device.

Figure 10:
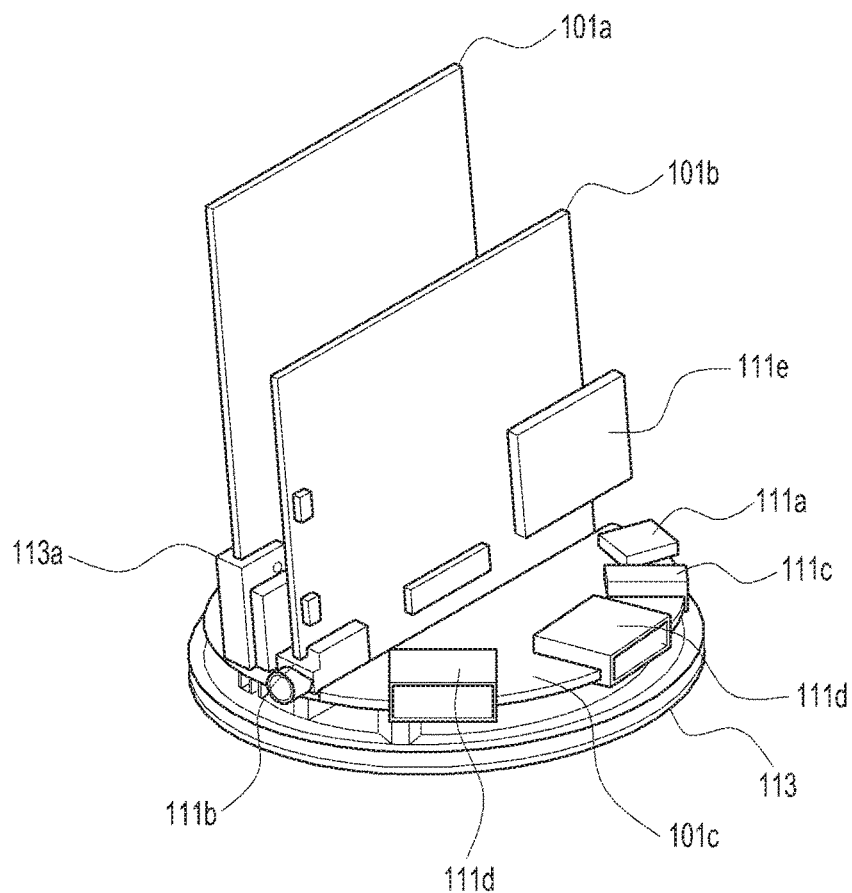
FIG. 10 is a perspective view illustrating a main configuration of the main unit in an electronic device according to various embodiments of the present disclosure.
Figure 11:
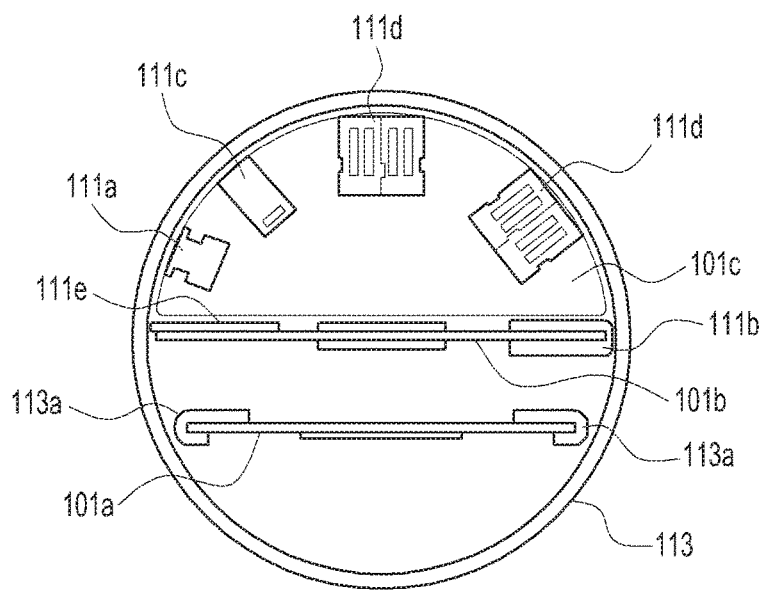
FIG. 11 is a plan view illustrating the main configuration of the main unit in the electronic device according to various embodiments of the present disclosure.

FIG. 10 is a perspective view illustrating a main configuration of the main unit in an electronic device 100 according to various embodiments of the present disclosure. FIG. 11 is a plan view illustrating the main configuration of the main unit in the electronic device 100 according to various embodiments of the present disclosure.

Referring to FIGS. 10 and 11, according to the present disclosure, at least some of the connector members 111a, 111b, 111c, 111d, and 111e of the electronic device 100 may be arranged along the circumferential direction of the first housing 111. In arranging the connector members 111a, 111b, 111c, 111d, and 111e, the electronic device 100 may further include a third circuit board 101c embedded in the main unit 101. The third circuit board 101c may be disposed in a direction perpendicular to the above-described first and second circuit boards 101a and 101b, and may take a form of a flat plate of a fan shape (or a semi-circular shape) corresponding to the shape of the inner space of the first housing 111. At least some of the above-described connector members 111a, 111b, 111c, 111d, and 111e may be arranged along the circumferential direction of the third circuit board 101c.

Although not illustrated, the first, second, and third circuit boards 101a, 101b, and 101c may be connected with each other through separate connection means, such as a flexible printed circuit board. According to various embodiments of the present disclosure, a socket (not illustrated), on which a plurality of connection pins are arranged, may be provided on the third circuit board 101c, and each of the first and second circuit board 101a and 101b may be inserted into the socket to be electrically connected. It is noted that each of the connector members 111a, 111b, 111c, 111d, and 111e may be disposed at a proper position according to a size and a shape thereof, or according to the inner space of the first housing 111, and the present disclosure is not limited to the arrangement structure illustrated in FIG. 10 or FIG. 11.

According to the above-described embodiment of the present disclosure, a constitution is exemplified in which the electronic device 100 that includes one main unit 101 and one or two module units 102. However, more module units 102 may be coupled to the main unit 101 or another module unit 102. According to a function incorporated in a module unit 102 directly coupled to the main unit 101 or a module unit 102 indirectly coupled to the main unit 101 (e.g., a module unit electrically connected with the main unit through another module unit), the user may diversify the performance or the function of the electronic device 100. Such a constitution will be described with reference to FIG. 12.

Figure 12:
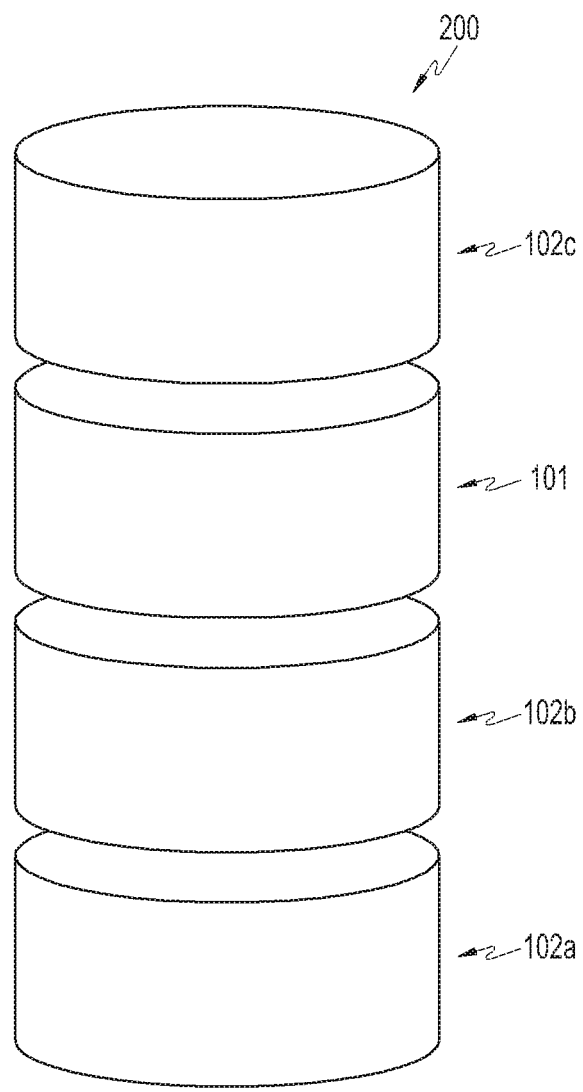
FIG. 12 is a view for describing an example of utilizing an electronic device according to various embodiments of the present disclosure.

FIG. 12 is a view for describing an example of utilizing an electronic device 200 according to various embodiments of the present disclosure.

According to the present embodiment, the electronic device 200 may include a plurality of module unit 102a, 102b, and 102c. In the following detailed description, the module units may be divisionally described as a "first module unit 102a," a "second module unit 102b," and a "third module unit 102c." However, it is noted that this is merely to make the description concise, and the present disclosure is not limited by such division or the number of module units exemplified in the present embodiment.

Referring to FIG. 12, the electronic device 200 may include a plurality of module units 102a, 102b, and 102c electrically connected to the main unit 101. The module unit 102a, 102b, and 102c may be directly bound to the main unit 101 or bound to another module unit coupled to the main unit 101 to be electrically connected with the main unit 101. Each of the main unit 101 and the module units 102a, 102b, and 102c includes the above-described binding members and connection members disposed on at least one of the top surface and the bottom surface thereof so that they may be mechanically or electrically coupled and connected with each other.

Each of the main unit 101 and the module units 102a, 102b, and 102c may have a cylindrical shape. In addition, the main unit 101 and the module units 102a, 102b, and 102c may also take a cylindrical shape in the state where they are coupled to each other. However, the present disclosure is not necessarily limited thereto. For example, each of the main unit 101 and the module units 102a, 102b, and 102c may have a rectangular parallelepiped shape, and the main unit 101 and the module units 102a, 102b, and 102c may be bound and coupled to each other such that the bottom surface of the main unit 101 and the top surface of any of the module unit 102a, 102b, and 102c face each other. When each of the main unit 101 and the module units 102a, 102b, and 102c has a rectangular parallelepiped shape, one side surfaces of the main unit 101 and the module unit(s) 102a, 102b, and/or 102c adjacent to the main unit 101 may flush with each other in the state where they are bound and coupled to each other.

The electronic device 200 may include a first module unit 102a in which a battery is embedded, a second module unit 102b in which a graphic module or an auxiliary storage device is embedded, or a third module unit 102c in which a sound module or an optical module is embedded. The circuit devices which are respectively embedded in the first, second, and third module unit 102a, 102b, and 102c, may be combined to be different from the exemplified embodiment to configure a new fourth module unit. According to various embodiments of the present disclosure, besides the above-mentioned circuit devices embedded in each of the first, second, and third module units 102a, 102b, and 102c, fifth and sixth modules equipped with various antenna devices or various sensors (e.g., a temperature/humidity sensor, a proximity light sensor, or a bio signal sensor) may be implemented. The user may select, purchase and possess necessary module unit(s) among the various module units. In addition, the user may select a desired module unit(s) among the module units that the user possesses, and mount the selected module unit(s) on the main unit 101 according to the use purpose of the electronic device 200. For example, the user may utilize the electronic device 200 in various uses according to the user's intention. In addition, the electronic device 200 may include a module unit, in which a circuit device equivalent to at least one of the circuit boards equipped in the main unit 101, for example, a processor is embedded. When the module unit in which the circuit device equivalent to at least one of the circuit boards of the main unit 101 is connected to the main unit 101, the electronic device 200 may exhibits a higher function (a function higher than the function obtained when only the main unit 101 is operated).

When including a processor, a communication module, and a storage device, the main unit 101 may provide a function equivalent to that of an electronic device such as a desktop PC or a notebook PC as itself. In utilizing the function equivalent to that of the desktop PC or the notebook PC through the main unit 101, the connector members 111a, 111b, 111c, 111d, and 111e may provide means for connecting with an input device, such as a keyboard or a mouse, and an output device, such as a display device. At least one of the connector members 111a, 111b, 111c, 111d, and 111e may be allocated as a power connector so that the main unit 101 can be supplied with the power through the at least one connector member.

As described above, the first module unit 102a may include a battery embedded therein. For example, the main unit 101 may be operated by receiving the power supplied from the first module unit 102a. Since the electronic device 200 includes the first module unit 102a detachably mounted on the main unit 101, the user may conveniently use the electronic device 200 at a desired place while carrying the electronic device 200.

The second module unit 102b may include a graphic module or an auxiliary storage device. For example, when the second module unit 102b is coupled to the main unit 101 or another module unit coupled to the main unit 101, the graphic performance of the electronic device 200 may be improved or the data storage capacity of the electronic device 200 may be extended.

The third module unit 102c may include a sound module or an optical module embedded therein so that the input/output device of the electronic device 200 itself may be extended. For example, when the sound module embedded in the third module unit 102c includes a microphone or speaker phone of high sound quality, the quality of the sound input to/output from the electronic device 200 may be improved. The optical module embedded in the third module unit 102c may include a camera or a projector, and the electronic device 200 may photograph a video image using the optical module of the third module unit 102c or output a generated picture through the main unit 101 (or the second module unit 102b). When the third module unit 102c includes a sound module or an optical module, the third module unit 102c may be connected with the main unit 101 or another electronic device in a wireless communication manner, such as Bluetooth. For example, the third module unit 102c may be combined with another electronic device as itself to provide an input/output function of a high quality sound.

The present embodiment exemplifies a constitution in which each of the second and third module units 102b and 102c is directly coupled to the main unit 101, and the first module unit 102a is connected to the main unit 101 through the second module unit 102b. However, the present disclosure is not necessarily limited thereto. For example, the sequence or arrangement of coupling each of the first, second, and third module units 102a, 102b, and 102c may be variously implemented according to the user's intension.

Each of FIGS. 13 to 16 exemplifies a connection structure between the main unit 101 and the module units 102a, 102b, and 102c in the electronic device 200 according to various embodiments of the present disclosure.

Figure 13:
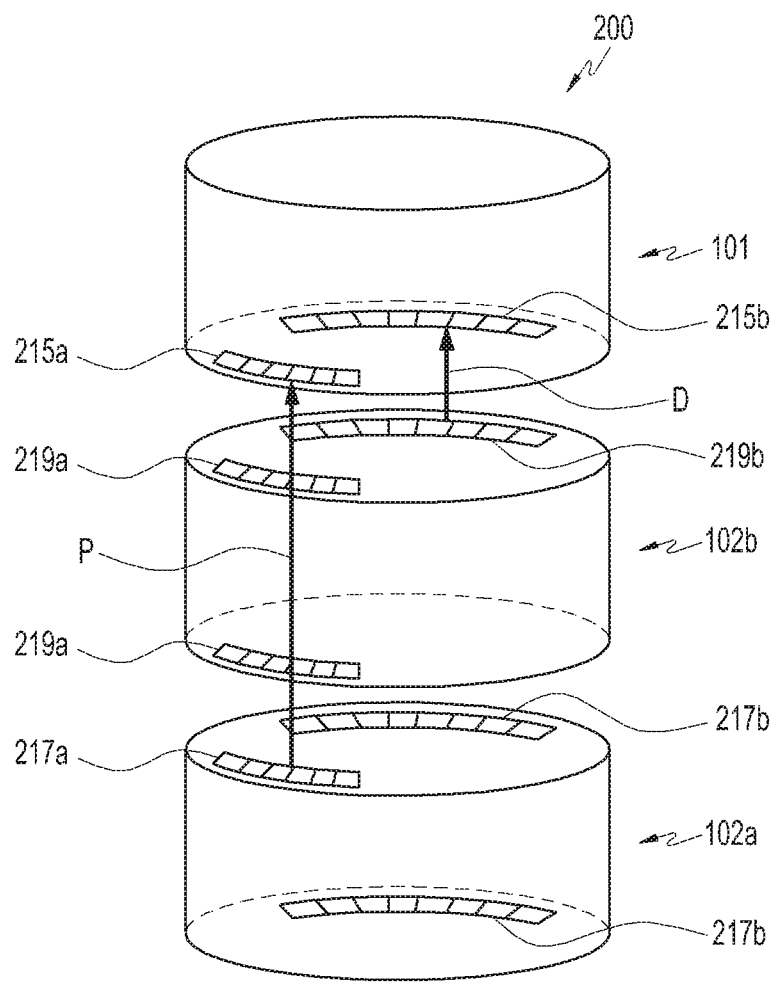
FIGS. 13, 14, 15, and 16 are views exemplifying connection structures between a main unit and module units in the electronic device according to various embodiments of the present disclosure.
Figure 14:
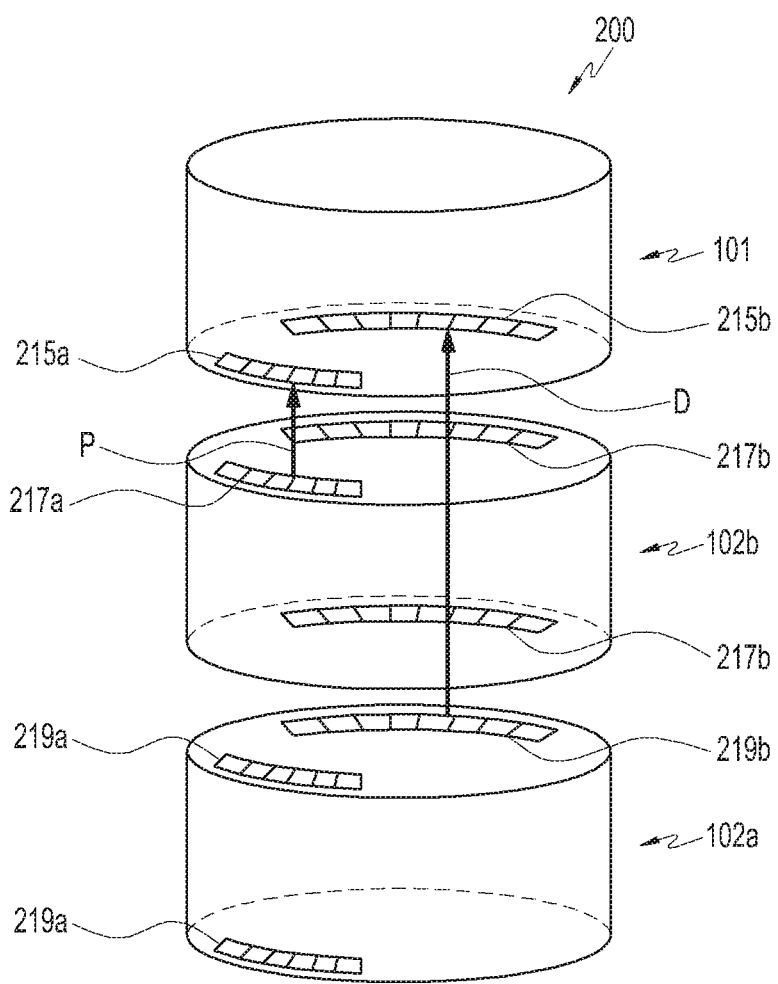

Referring to FIGS. 13 and 14, the main unit 101 and the module units 102a and 102b may be electrically connected with each other through the structures of the above-described first and second connection terminals 117, 125, and 125d. In addition, when a plurality of module units are connected with the main unit 101, one module unit may be electrically connected with the main unit 101 through another module unit. For example, each of the module units 102a and 102b may provide a connection route for connecting another module unit to the main unit 101.

FIG. 13 exemplifies a constitution, in which the second module unit 102b is directly connected to the main unit 101 and the first module unit 102a is coupled to the second module unit 102b to be electrically connected to the main unit 101 through the second module unit 102b. FIG. 14 exemplifies a constitution, in which the first module unit 102a is directly coupled to the main unit 101 and the second module unit 102b is coupled to the first module unit 102a to be electrically connected to the main unit 101 through the first module unit 102a.

The main unit 101 includes first connection terminals for connection with the first or second module unit 102a or 102b, in which the first connection terminals may include first power terminals 215a and first data signal terminals 215b. Each of the first and second module units 102a and 102b includes second connection terminals for connection therebetween or connection with the main unit 101, in which the second connection terminals may include second power terminals 217a and 219a and second data signal terminals 217b and 219b.

When the second module unit 102b is coupled to the main unit 101, the first module unit 102a may supply power to the main unit 101 as the second power terminals 217a thereof are connected to the main unit 101 through the second power terminals 219a of the second module unit 201b. The second module unit 102b may exchange, for example, a video signal by being connected to the main unit 101 through the second data signal terminals 219b.

When the first module unit 102a is coupled to the main unit 101, the first module unit 102a may supply power to the main unit 101 as the second power terminals 217a thereof are connected with the first power terminals 215a. The second module unit 102b may be electrically connected with the main unit 101 through the first module unit 102a. For example, when the second data signal terminals 219b of the second module unit 102b may be connected with the first data signal terminals 215b of the main unit 101 through the second data signal terminals 217b of the first module unit 102a.

In this way, the first and second module units 102a and 102b may exchange the power or data signals by being electrically connected with the main unit 101 or another module unit.

Figure 15:
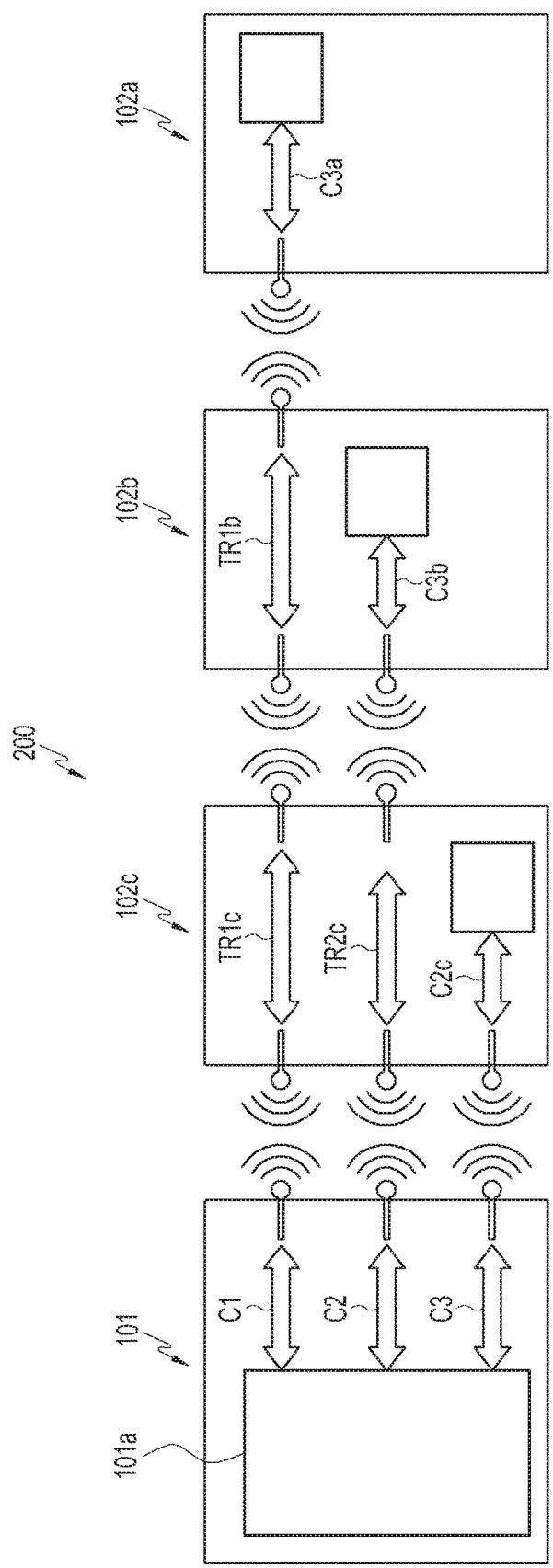
Figure 16:
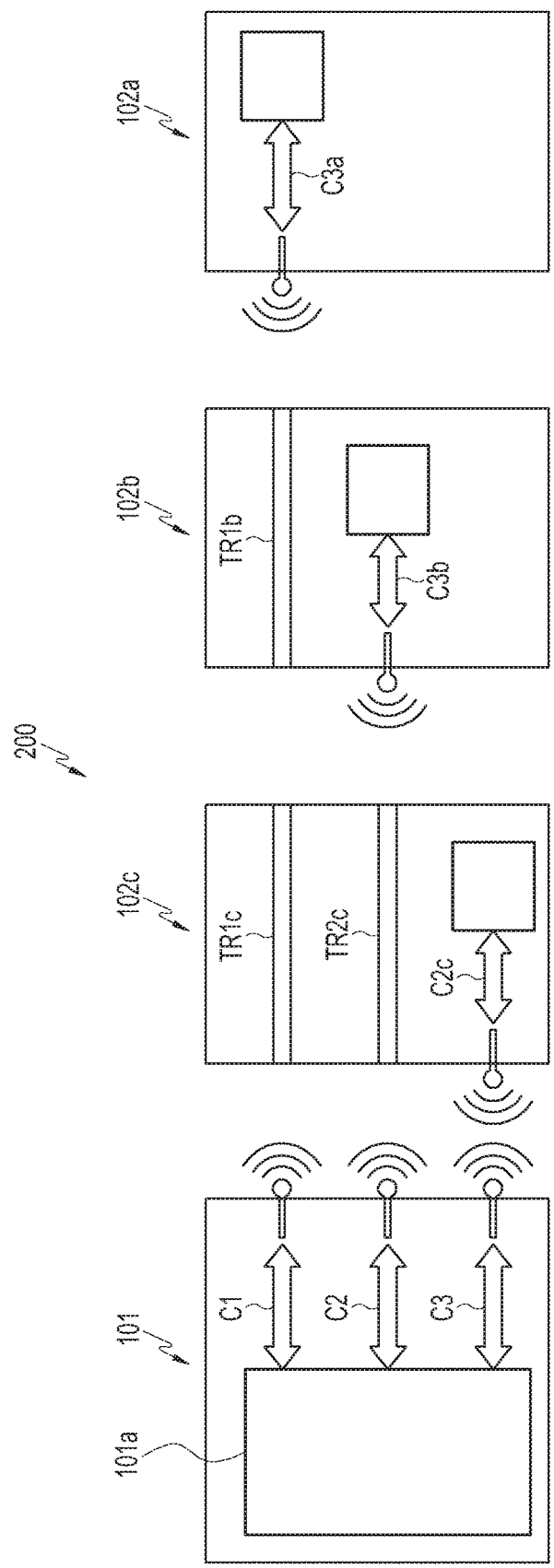

FIGS. 15 and 16 exemplify a structure in which a power or a data signal is exchanged wirelessly between the main unit 101 and one of the module units 102a, 102b, and 102c and between the module units 102a, 102b, and 102c. For the concise description, the foregoing embodiment of the present disclosure exemplifies a structure in which the power or the data signal is exchanged through a direct contact manner of the connection terminals, and the following embodiment of the present disclosure exemplifies a structure in which the power or the data signal is exchanged in a wireless manner, but the present disclosure is not limited thereto. For example, power supply may be performed through the direct contact manner of the connection terminals, and a data signal of, for example, a sound or a video may be exchanged in a wireless manner Although not illustrated in the specific embodiments of the present disclosure, according to various embodiments of the present disclosure, in the electronic device, the connection between the main unit and the module unit(s) may be implemented through another type of power or data signal exchange method such as an optical communication method.

Referring to FIGS. 15 and 16, in the electronic device 200, the main unit 101 may be provided with a plurality of wireless communication channels C1, C2, and C3 to exchange a power or a data signal with the module units 102a, 102b, and 102c in a wireless communication manner, for example, through a communication standard, such as Bluetooth or wireless gigagit alliance (WiGig). Each of the wireless communication channels C1, C2, and C3 may connected to a circuit device embedded in the main unit 101, such as a communication module or a processor mounted on the above-described first circuit board 101a. Depending on the number of wireless communication channels allocated to the main unit 101, the number of module units capable of exchanging a data signal directly or indirectly (for example, through another module unit) with the main unit 101 may be set. However, when the main unit 101 includes the above-described connection terminals in addition to the wireless communication channels, the module units more than the number of the wireless communication channels may be connected with the main unit 101.

Each of the module units 102a, 102b, and 102c may include connection channels C3a, C3b, and C2c that perform a wireless communication with the main unit 101 or another module unit. In addition, each of the module units 102a, 102b, and 102c may include transmission channels TR1b, TR1c, and TR2c that relay a wireless communication between the main unit 101 and another module unit. For example, among the module units, the first module unit 102a includes the connection channel C3a that performs a wireless communication with the main unit 101 or another module unit, and is capable of exchanging a data signal directly or indirectly through the second and third module units 102b and 102c with the main unit 101. For example, each of the second and third module units 102b and 102c may include transmission channels TR1b and TR1c that relay a wireless data signal between the main unit 101 and the first module unit 102a. As a result, the first module unit 102a may be directly coupled to the main unit 101 or connected to the main unit 101 through the second and/or third module units 102b and 102c to exchange a data signal with the main unit 101.

The second module unit 102b may include a connection channel C3b that performs a wireless communication with the main unit 101 or another module unit, and a transmission channel (e.g., the transmission channel TR1b) that relays a data signal between the main unit 101 or the third module unit 102c and another module unit (e.g., the first module unit 102a). The second module unit 102b may exchange a data signal directly or indirectly through the third module unit 102c with the main unit 101. For example, the third module unit 102c may include a second transmission channel TR2c that relays a wireless data signal between the main unit 101 and the second module unit 102b. As a result, the second module unit 102b may be directly coupled to the main unit 101 or connected to the main unit 101 through the third module unit 102c to relay a wireless data signal between the main unit 101 and/or the third module unit 102c and the first module unit 102a while exchanging a data signal with the main unit 101.

The third module unit 102c may include a connection channel C2c that performs a wireless communication with the main unit 101, and transmission channels (e.g., the transmission channel TR1c and the second transmission channel TR2c) that relay a signal between the main unit 101 and other module units (e.g., the first and second module units 102a and 102b). For example, the third module unit 102c may be directly connected with the main unit 101 relay a wireless data signal between the main unit 101 and the first and/or second module units 102a and 102b while exchanging a data signal with the main unit 101 in a wireless communication manner.

According to various embodiments of the present disclosure, the electronic device 200 may further include another module unit, for example, a fourth module unit including a transmission channel that relays a wireless data signal between the main unit 101 and the third module unit 102c. As a result, the third module unit 102c may be connected to the main unit 101 through the fourth module unit, and may exchange a data signal with the main unit 101 through the transmission channel provided in the fourth module unit in a wireless manner. The fourth module unit as described above may further include transmission channels that relay a wireless signal between the first and/or second module units 102a and 102b and the main unit 101.

According to various embodiments of the present disclosure, the above-described transmission channels (TR1b, TR1c, TR2c) may include a circuit device equipped with, for example, a transmission line, or an amplifier, a modulator, and various filters are incorporated. In addition, the transmission channels TR1*b*, TR1*c*, and TR2*c* may be implemented in a through-hole form, as illustrated in FIG. 16. For example, as the second and/or third module units 102*b* and 102*c* include through-holes that provide a route or a space, through which a wireless signal progresses, between an antenna provided at the main unit 101 side and an antenna provided at the first module unit 102*a* side, transmission channels may be implemented.

In the electronic device 200 as described above, in implementing the wireless communications between the main unit and the module units, the module units may include different numbers of module units, respectively. For example, when a plurality of module units are connected serially and coupled to the main unit and a required number of transmission channels are formed in each of the module units after setting the coupling sequence thereof, the structure may be simplified. In addition, each of the module units includes a connection channel capable of being connected one of the wireless communication channels of the main unit so that each module unit may independently and directly connected to the main unit to exchange a data signal with the main unit.

As described above, according to various embodiments of the present disclosure, an electronic device may include: a main unit including a first top surface, a first bottom surface opposite to the first top surface, and a first side surface configured to connect the first top surface and the first bottom surface; at least one module unit including a second top surface, a second bottom surface opposite to the second top surface, and a second side surface configured to connect the second top surface and the second bottom surface. The module unit may be configured to couple to and uncouple from the main unit or another module unit in a state where one of the second top surface, the second bottom surface, and the second side surface faces one of the first top surface, the first bottom surface, and the first side surface. When the module unit is coupled to the main unit, the module unit may be electrically connected with the main unit.

According to various embodiments of the present disclosure, each of the main unit and the module unit may comprise a cylindrical shape, in which each of the first and second side surfaces is formed in a curved surface.

According to various embodiments of the present disclosure, the module unit may be coupled to the main unit to form a cylindrical shape by being rotated in a state where the second top surface or the second bottom surface faces and is in contact with the first bottom surface or the first top surface.

According to various embodiments of the present disclosure, the electronic device may further include first connection terminals provided on the first top surface or the first bottom surface; and second connection terminals provided on the second top surface or the second bottom surface. The second connection terminals may be connected with the first connection terminals, respectively, in a state where the module unit is coupled with the main unit.

According to various embodiments of the present disclosure, the first connection terminals and the second connection terminals may be respectively arranged along a rotating direction of the module unit.

According to various embodiments of the present disclosure, regions, in which the first connection terminals and the second connection terminals are arranged, respectively, may be formed to be inclined in relation to the rotating direction of the module unit. When the module unit is rotated in a direction of coupling the module unit with the main unit, the regions may be moved closer to each other.

According to various embodiments of the present disclosure, each of the first connection terminals and the second connection terminals may be arranged along a direction from a center of one of the first top surface, the first bottom surface, the second top surface, and the second bottom surface toward the first side surface or the second side surface.

According to various embodiments of the present disclosure, one of the second connection terminals may be connected to one of the first connection terminals at a first angular point in the rotating direction of coupling the module unit to the main unit, and the remaining second connection terminals may be connected with the remaining first connection terminals, respectively, between the first angular point and a second angular point in a direction opposite to the rotating direction of coupling the module unit to the main unit.

According to various embodiments of the present disclosure, when the module unit is rotated with respect to the main unit to leave from the first angular point, the one of the second connection terminals may leave from the first connection terminal so that the connection is released.

According to various embodiments of the present disclosure, the electronic device may further include connector members arranged along one direction on the first side surface.

According to various embodiments, each of the connector members may include at least one of a USB connector, an HDMI connector, an ear jack, a power connector, or a storage medium socket.

According to various embodiments of the present disclosure, the main unit may include a cylindrical housing with one opened end, and a cover member coupled to the opened end of the housing to provide the first bottom surface, and one of the module units may be coupled to face the cover member.

According to various embodiments of the present disclosure, the main unit may further include at least one circuit board fixed to the cover member, and connector members disposed on the circuit board.

According to various embodiments of the present disclosure, the module unit coupled to the main unit or the other module unit may exchange data with the main unit or the other module unit through a wireless communication.

According to various embodiments of the present disclosure, each of the module unit may include: a connection channel configured to wirelessly communicate with the main unit; and a transmission channel configured to relay a wireless communication between the main unit and the other module unit.

According to various embodiments of the present disclosure, the transmission channel may include a hole formed through the module unit.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a main unit including a first top surface, a first bottom surface opposite to the first top surface, and a first side surface configured to connect the first top surface and the first bottom surface; and at least one module unit including a second top surface, a second bottom surface opposite to the second top surface, and a second side surface configured to connect the second top surface and the second bottom surface, wherein a module unit of the at least one module unit is configured to couple to and uncouple from the main unit or another module unit of the at least one module unit in a state where one of the second top surface, the second bottom surface, or the second side surface faces one of the first top surface, the first bottom surface, or the first side surface, wherein, when the module unit is coupled to the main unit, the module unit is electrically connected with the main unit, wherein the main unit includes a cylindrical housing with an opened end, and a cover member coupled to the opened end to provide the first bottom surface, and wherein one of the module units of the at least one module unit is coupled to face the cover member.

2. The electronic device of claim 1, wherein each of the main unit and the module unit comprises a cylindrical shape in which each of the first and second side surfaces is formed in a curved surface.

3. The electronic device of claim 1, wherein the module unit is coupled to the main unit to form a cylindrical shape by being rotated in a state where the second top surface or the second bottom surface faces and is in contact with the first bottom surface or the first top surface.

4. The electronic device of claim 3, further comprising:
first connection terminals provided on the first top surface or the first bottom surface; and
second connection terminals provided on the second top surface or the second bottom surface,
wherein the second connection terminals are connected to the first connection terminals, respectively, in a state where the module unit is coupled with the main unit.

5. The electronic device of claim 4, wherein the first connection terminals and the second connection terminals are respectively arranged along a rotating direction of the module unit.

6. The electronic device of claim 5,
wherein regions, in which the first connection terminals and the second connection terminals are arranged, respectively, are formed to be inclined in relation to the rotating direction of the module unit, and
wherein, when the module unit is rotated in a direction of coupling the module unit with the main unit, the regions are moved closer to each other.

7. The electronic device of claim 5,
wherein one of the second connection terminals is connected to one of the first connection terminals at a first angular point in the rotating direction of coupling the module unit to the main unit, and wherein the remaining second connection terminals are connected to the remaining first connection terminals, respectively, between the first angular point and a second angular point in a direction opposite to the rotating direction of coupling the module unit to the main unit.

8. The electronic device of claim 4, wherein the first connection terminals and the second connection terminals are arranged along a direction from a center of one of the first top surface, the first bottom surface, the second top surface, or the second bottom surface, toward the first side surface or the second side surface.

9. The electronic device of claim 8,
wherein one of the second connection terminals is connected to one of the first connection terminals at a first angular point in the rotating direction of coupling the module unit to the main unit, and
wherein the remaining second connection terminals are connected to the remaining first connection terminals, respectively, between the first angular point and a second angular point in a direction opposite to the rotating direction of coupling the module unit to the main unit.

10. The electronic device of claim 9, wherein when the module unit is rotated with respect to the main unit to leave from the first angular point, the one of the second connection terminals leaves from the first connection terminal so that the connection is released.

11. The electronic device of claim 1, further comprising:
connector members arranged along one direction on the first side surface.

12. The electronic device of claim 11, wherein each of the connector members includes at least one of a universal serial bus (USB) connector, a high definition multimedia interface (HDMI) connector, an ear jack, a power connector, or a storage medium socket.

13. The electronic device of claim 1, wherein the main unit further comprises at least one circuit board fixed to the cover member, and connector members disposed on the circuit board.

14. The electronic device of claim 1, wherein the module unit is coupled to the main unit or the other module unit exchanges data with the main unit or the other module unit through a wireless communication.

15. The electronic device of claim 14, wherein each of the at least one module unit further includes:
a connection channel configured to wirelessly communicate with the main unit; and
a transmission channel configured to relay a wireless communication between the main unit and the other module unit.

16. The electronic device of claim 15, wherein the transmission channel includes a hole formed through the module unit.

* * * * *